United States Patent
Li et al.

(10) Patent No.: US 12,218,782 B2
(45) Date of Patent: Feb. 4, 2025

(54) TECHNIQUES FOR COMMUNICATING BEAM INFORMATION

(71) Applicant: ZTE Corporation, Guangdong (CN)

(72) Inventors: Yu Ngok Li, Guangdong (CN); Bo Gao, Guangdong (CN); Yijian Chen, Guangdong (CN); Huahua Xiao, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/528,564

(22) Filed: Dec. 4, 2023

(65) Prior Publication Data

US 2024/0113918 A1 Apr. 4, 2024

Related U.S. Application Data (63) Continuation of application No. 17/373,371, filed on Jul. 12, 2021, now Pat. No. 11,870,610, which is a
(Continued)

(51) Int. Cl.
*H04L 25/02* (2006.01)
*H04B 7/06* (2006.01)
(Continued)

(52) U.S. Cl.
CPC ....... *H04L 25/0224* (2013.01); *H04B 7/0626* (2013.01); *H04B 7/0802* (2013.01);
(Continued)

(58) Field of Classification Search
None
See application file for complete search history.

(56) References Cited

U.S. PATENT DOCUMENTS

2015/0029966 A1\* 1/2015 Park .................. H04L 5/005
370/329
2015/0036621 A1 2/2015 Shin
(Continued)

FOREIGN PATENT DOCUMENTS

CN 103945447 A 7/2014
CN 104106223 A 10/2014
(Continued)

OTHER PUBLICATIONS

EPO, Communication pursuant to Article 94(3) for European Application No. 17908238.3, mailed on Jan. 27, 2023, 67 pages.
(Continued)

*Primary Examiner* — Minh Trang T Nguyen
(74) *Attorney, Agent, or Firm* — Perkins Coie LLP (57) ABSTRACT

The disclosed technology includes techniques for facilitating the operation of a multi-antenna communication system. The disclosed technology can be implemented to provide a method for wireless communications which includes receiving, by a user device, an indication about an association between multiple reference resources and a target resource at the user device. The association includes properties of a communication channel to and/or from the user device, and wherein at least one property of the communication channel is different among the multiple reference resources, and performing wireless communication using the indication.

19 Claims, 7 Drawing Sheets

Related U.S. Application Data continuation of application No. 16/675,064, filed on Nov. 5, 2019, now Pat. No. 11,063,787, which is a continuation of application No. PCT/CN2017/083348, filed on May 5, 2017.

(51) Int. Cl.
  *H04B 7/08* (2006.01)
  *H04B 17/345* (2015.01)
  *H04B 17/364* (2015.01)
  *H04L 5/00* (2006.01)
  *H04W 72/23* (2023.01)

(52) U.S. Cl.
  CPC ......... *H04B 7/0857* (2013.01); *H04B 7/0888* (2013.01); *H04B 17/345* (2015.01); *H04B 17/364* (2015.01); *H04L 5/0048* (2013.01); *H04L 25/0204* (2013.01); *H04W 72/23* (2023.01)

(56) References Cited

U.S. PATENT DOCUMENTS

| | | |
|---|---|---|
| 2015/0215061 A1 | 7/2015 | Tsai et al. |
| 2016/0191136 A1 | 6/2016 | Liu et al. |
| 2016/0262161 A1 | 9/2016 | Li et al. |
| 2019/0123864 A1 | 4/2019 | Zhang et al. |
| 2020/0076648 A1 | 3/2020 | Li et al. |

FOREIGN PATENT DOCUMENTS

| | | |
|---|---|---|
| CN | 104247291 A | 12/2014 |
| CN | 104995863 A | 10/2015 |
| CN | 105359607 A | 2/2016 |
| CN | 105792373 A | 7/2016 |
| CN | 106464322 A | 2/2017 |
| WO | 2014/128621 A1 | 8/2014 |
| WO | 2015/115991 A1 | 8/2015 |
| WO | 2017/023231 A1 | 2/2017 |

OTHER PUBLICATIONS

CIPO, Office Action for Chinese Patent Application No. 201780090444.0, mailed Aug. 4, 2021 (13 pages).

EPO, Extended Search Report mailed on Feb. 25, 2020 for European Application No. 17908238.3, filed on May 5, 2017 (10 pages).

International Search Report and Written Opinion mailed on Feb. 6, 2018 for International Application No. PCT/CN2017/083348, filed on May 5, 2017 (7 pages).

EPO, Communication pursuant to Article 94(3) EPC for European Application No. 17908238.3, mailed Jan. 28, 2021 (7 pages).

* cited by examiner

TECHNIQUES FOR COMMUNICATING BEAM INFORMATION

CROSS REFERENCE TO RELATED APPLICATIONS

This patent document is a continuation of and claims benefit of priority of U.S. patent application Ser. No. 17/373,371, filed Jul. 12, 2021 which is a continuation of and claims benefit of priority of U.S. patent application Ser. No. 16/675,064, filed Nov. 5, 2019, and issued as U.S. Pat. No. 11,063,787, issued Jul. 13, 2021, which is a continuation of International Patent Application No. PCT/CN2017/083348, filed on May 5, 2017. The entire content of the before-mentioned patent applications is incorporated by reference as part of the disclosure of this application.

TECHNICAL FIELD

This document relates to systems, devices and techniques for wireless communications.

BACKGROUND

Efforts are currently underway to define next generation communication networks that provide greater deployment flexibility, support for a multitude of devices and services and different technologies for efficient bandwidth utilization.

SUMMARY

This document describes technologies, among other things, techniques for facilitating the operation of a multi-antenna communication system.

In one aspect, the disclosed technology can be implemented to provide a method for wireless communications which includes receiving, by a user device, an indication about an association between X reference resources, where X is an integer greater than 1, and a target resource at the user device, wherein the association includes properties of a communication channel to and/or from the user device, and wherein at least one property of the communication channel is different among the multiple reference resources. In some implementations, the method further includes performing wireless communication using the indication.

In another aspect, the disclosed technology can be implemented to provide a method of wireless communications that includes transmitting, to a user device, an indication about an association between X reference resources, where X is an integer greater than 1, and a target resource at the user device, wherein the association includes properties of a communication channel to and/or from the user device, and wherein at least one property of the communication channel is different among the multiple reference resources. In some implementations, this method further includes performing a transmission that uses at least some of the multiple reference resources to transmit a signal to the user device.

The details of one or more implementations are set forth in the accompanying attachments, the drawings, and the description below.

BRIEF DESCRIPTION OF THE DRAWINGS

Like reference symbols in the various drawings indicate like elements.

DETAILED DESCRIPTION

The Third generation partnership project (3GPP) has started the standardization process of new radio access technology for the 5th Generation wireless system. The new technology will consider frequency ranges up to 100 GHz. High-frequency communication, e.g., above 6 GHz, suffers from significant path loss and penetration loss compared to lower frequency communication, e.g., in the 3 GHz and 5 GHz bands. One solution to solve this problem is to deploy a large antenna array, e.g., an antenna array with many antennas, to achieve high beamforming gain to compensate the loss. Using a large antenna array can be a practical solution in a high frequency system due to the shortened wavelength of a high-frequency signal relative to a signal at a lower frequency. For around 30/70 GHz, up to 1024Tx antennas may be used. When the number of antennas used is so large, fully exploiting the MIMO gain by an all-digital beamforming in the baseband is not realistic due to problems on hardware cost, power consumption and standardization complexity.

The techniques described in the present document can be used to implement wireless devices that overcome the above-described, and other, problems. For example, using the disclosed techniques, a multi-antenna scheme that uses an analog/hybrid (e.g., analog and digital) beamforming for New Radio (NR) interface could be implemented in devices that perform transmission and reception at high frequencies.

Figure 1:
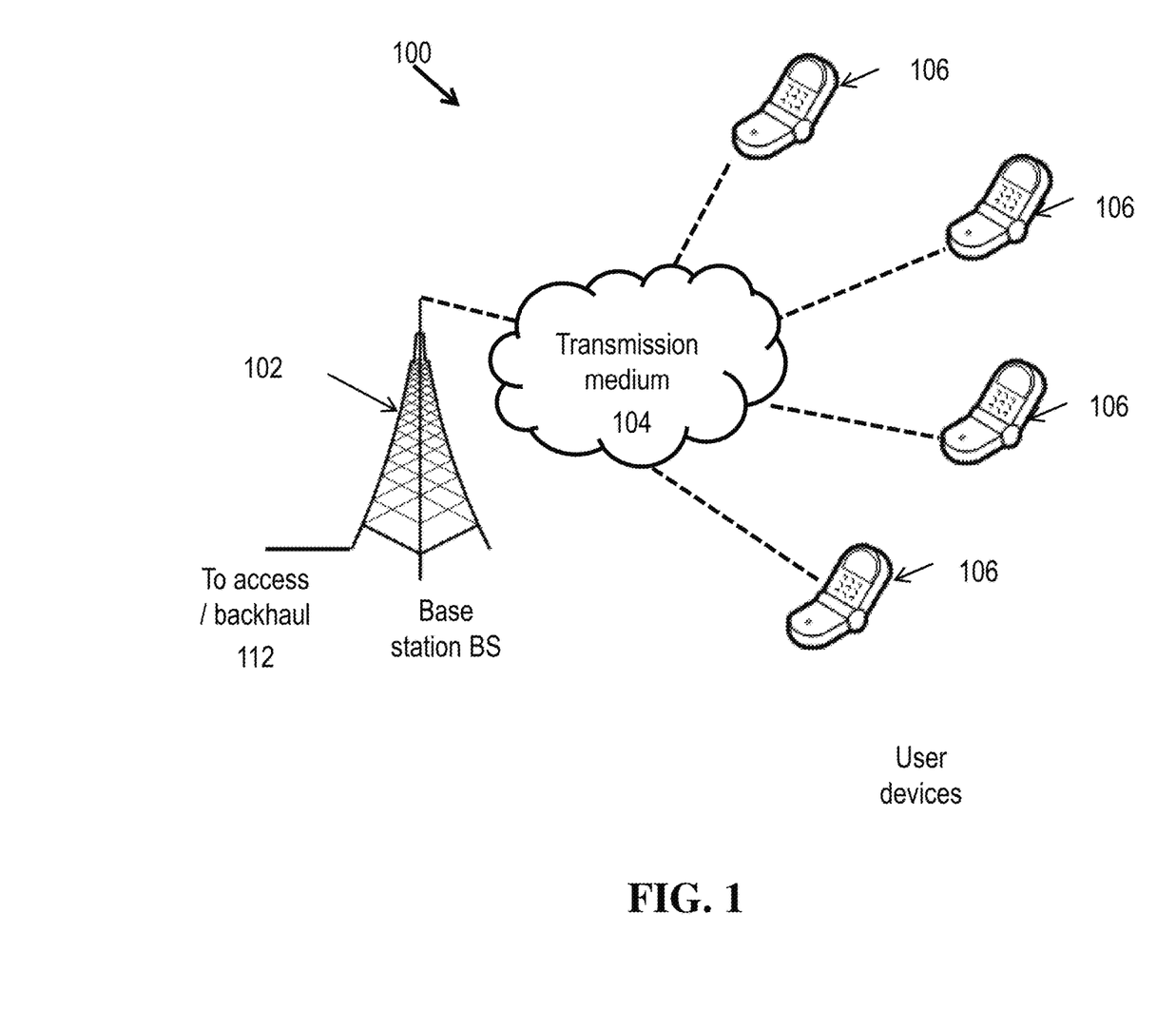
FIG. 1 shows an example of a wireless communications network.

FIG. 1 shows an example wireless communications network 100. The network 100 includes a base station BS 102 and multiple user devices 106 being able to communicate with each other over a transmission medium 104. The transmissions from the BS 102 to the devices 106 are generally called downlink or downstream transmissions. The transmissions from the devices 106 to the BS 102 are generally called uplink or upstream transmissions. The transmission medium 104 typically is wireless (air) medium. The BS 102 may also be communicatively coupled with other base stations or other equipment in the network via a backhaul or an access network connection 112.

Figure 2:
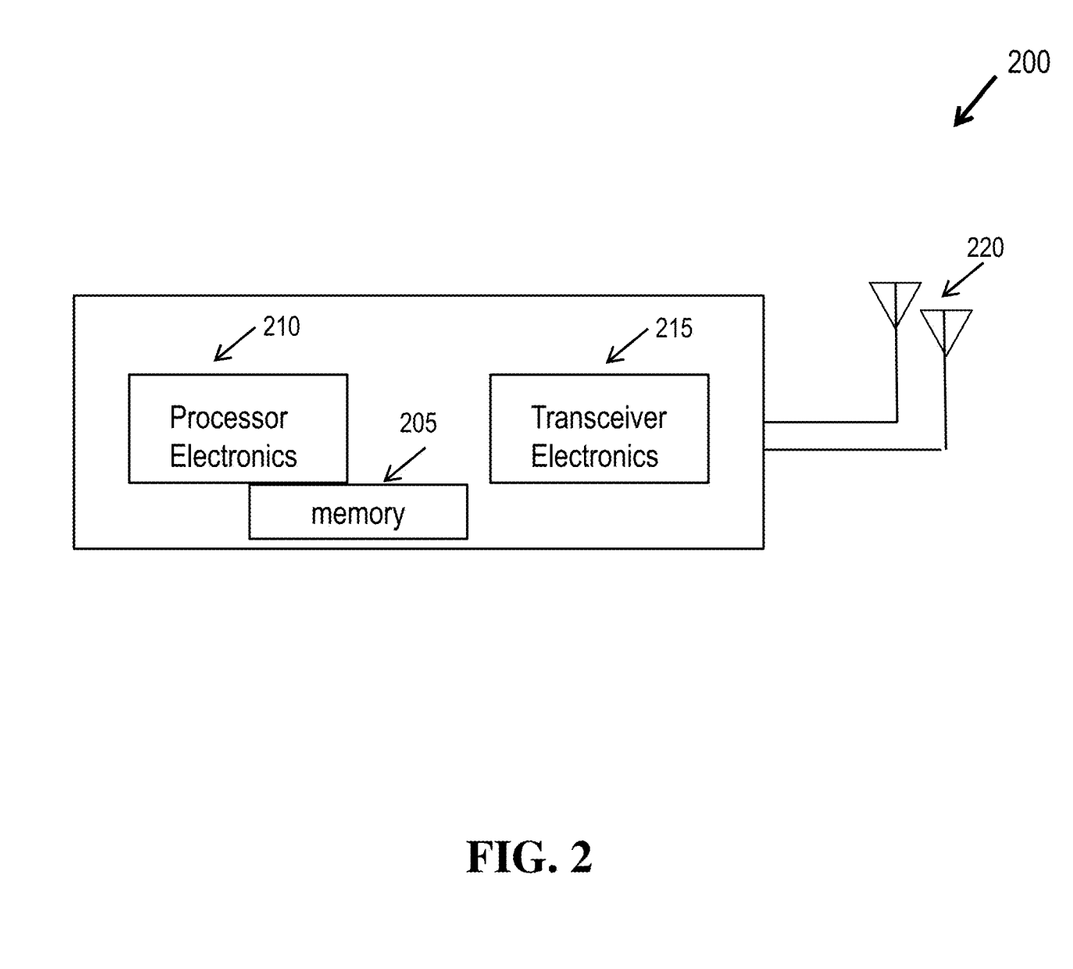
FIG. 2 shows an example of a wireless communications apparatus.

FIG. 2 is a block diagram of an example of a wireless communication apparatus 200. The apparatus 200 includes a processor 210 that may be configured to implement one of the techniques described herein, transceiver electronics 215 that is able to transmit signals or receive signals using the antenna(s) 220, and one or more memories 205 that may be used to store instructions executable by the processor 210 and/or data storage. As discussed throughout the document, the number of antennas 220 could be large (e.g., 8, 16, 32, or 64 or more) and such an apparatus may benefit from techniques described herein.

Reference signals are commonly used in wireless communications for a variety of reasons such as to help with signal acquisition, channel estimation, signal pre-coding, and so on. Some types of reference signals may undergo the same transmitter-side processing as data (e.g., pre-coding), while some other types of reference signals may be combined with other data after data has undergone at least some processing at the transmitter.

For example, in 4G LTE, transmission of some reference signals is transparent to the receivers. For example, the precoder/beamformer used for Demodulation Reference Signal (DMRS) based data transmission is transparent to a user equipment (UE) because the beamformer used for data transmission is the same as the beamformer used for transmission of the reference signal and, as such, the DMRS and the UE do not know which beamformer is used for data transmission. Due to the transparency property, explicit indication of the beamformer is not needed. Instead, implicit information related to channel properties, e.g., Quasi-Co-Located (QCL) assumption is indicated to the UE to support data transmission from base stations in different locations. This means that subsets of channel properties observed from the reference resource can be assumed to be the same as those observed from the targeted resource, e.g., DMRS. To support multi-user multiple-input multiple output (MU-MIMO) transmissions, a UE can detect possible interference from DMRS ports and perform interference suppression accordingly. No additional indication from the base station is needed. This approach works fine for LTE because the design of LTE assumes that receiver uses digital receiver weights to suppress interference which means the weights can be adaptively changed after the reception of the digital baseband signal.

Different from LTE, a next generation UE, which may be operating at higher frequencies, may be expected to determine analog receive beam weights before the reception of signal because analog/hybrid beamforming may be used at the UE. Therefore, the UE should know the interference information in advance if interference suppression/cancellation is done in the analog domain.

In some embodiments the indication of spatial QCL assumption may be supported between DL RS antenna port(s) and the DMRS antenna port(s) of DL data channel. However, it is not known how this spatial QCL assumption is related, i.e., whether it is interference or composite channel of multiple beams if multiple antenna ports are associated. The techniques presented in this document can be used to build transmitters and receivers that address these problems, and others.

Examples of Multi-Beam Indication

To support multiple beam transmission on a target resource (e.g., a DMRS port), multiple reference resources (e.g., CSI-RS resources) may be associated with one target resource. The association can be set up via QCL assumptions which reflect the channel properties in at least one of the following aspects: Doppler spread, Doppler shift, delay spread, average delay, average gain, angle of arrival, angle of departure, angular spread, or spatial correlation. Multiple sets of these QCL assumptions are associated with one targeted resource so that the channel observed from the targeted antenna port has similar channel properties as the composite channel of multiple CSI-RS ports/resources. When the reference and targeted antenna ports are in different duplex direction (i.e., UL and DL), then its association refer to reciprocal channel observed from the reference resource.

Figure 3:
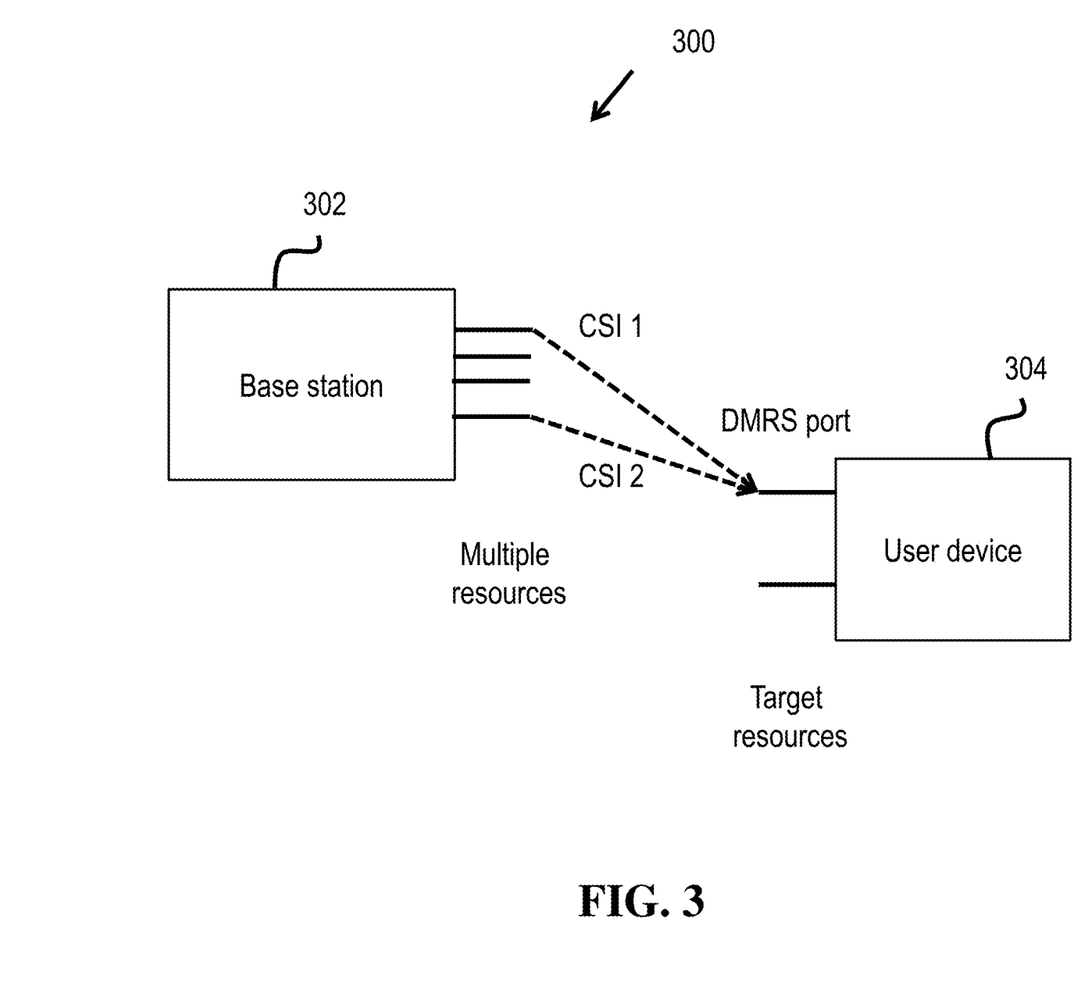
FIG. 3 shows an example of transmission between a base station and a user device.

FIG. 3 shows an example configuration 300 of communication between a base station 302, which may be implemented as depicted in FIG. 2, and may be similar to the BS 102, and a user device 304. The user device 304 may be similar to the user device 106 and may be implemented as depicted in FIG. 2. As depicted in FIG. 3, the base station 302 may transmit signals using multiple resources (e.g., CSI-RS ports) and the user device 304 may receive signals on a target resource, e.g., a receiving resource, e.g., a DMRS port.

If CSI-RS resource 1 and CSI-RS resource 2 are associated with one DMRS port in the aspect of angle of arrival, two angles of arrival (corresponding to the two beams transmitted from these two CSI-RS resources) are expected to be observed in the DMRS port. The signals associated with these two beams may have two different DMRS sequences but they are on the same DMRS port. In some embodiments, CSI-RS resource 1 and CSI-RS resource 2 may correspond to the same layer of the data associated with the DMRS port.

If CSI-RS resource 1 and CSI-RS resource 2 are associated with one DMRS port in the aspect of angle of arrival, two angles of arrival (corresponding to the two beams transmitted from these two CSI-RS resources) are expected to be observed in the DMRS port. The signals associated with these two beams may have two different DMRS sequences but they are on the same DMRS port. In some embodiments, CSI-RS resource 1 and CSI-RS resource 2 correspond to different layer of the data associated with the DMRS port.

If CSI-RS resource 1 and CSI-RS resource 2 are associated with CSI-RS resource 3 in the aspect of angle of arrival, two angles of arrival (corresponding to the two CSI-RS resources) are expected to be observed in the CSI-RS resource 3.

Each of the multiple reference resources associated with one targeted resource can be categorized as a channel part or an interference part. The UE is then indicated which resources belong to the channel part and which resources belong to the interference part.

For example, in the example discussed above, the UE may be indicated by BS that CSI-RS resource 1 and CSI-RS resource 2 are channel and interference parts respectively. If CSI-RS resource 1 and CSI-RS resource 2 are associated with one DMRS port in the aspect of angle of arrival, two angles of arrival (corresponding to the two CSI-RS resources) are expected to be observed in the DMRS port where the angle of arrival corresponding to CSI-RS resource 1 is the angle of arrival of the desired signal and the angle of arrival corresponding to CSI-RS resource 2 is the angle of arrival of the interference.

As another example, the UE may be indicated by the BS that CSI-RS resource 1 and CSI-RS resource 2 are channel and interference parts respectively. If CSI-RS resource 1 and CSI-RS resource 2 are associated with CSI-RS resource 3 in the aspect of angle of arrival, two angles of arrival (corresponding to the two CSI-RS resources) are expected to be observed in the CSI-RS resource 3 where the angle of arrival corresponding to CSI-RS resource 1 is the angle of arrival of the desired signal and the angle of arrival corresponding to CSI-RS resource 2 is the angle of arrival of the interference.

In some embodiments, if sounding reference signal SRS resource 1 and SRS resource 2 are associated with one UL DMRS port by indication, UE uses the same precoder/beam(s) as from these two SRS resources on the UL DMRS port to perform multi-beam/layer transmission on the DMRS port.

In some embodiments, if CSI-RS resource 1 and CSI-RS resource 2 are associated with one UL DMRS port by indication, UE uses the same receive precoder/beam(s) from these two CSI-RS resources to generate the reciprocal beams on the UL DMRS port to perform multi-beam/layer transmission on the DMRS port.

In some embodiments, the BS may also indicate to the UE the power offset for each channel/interference component corresponding to each CSI-RS resource.

Multi-Beam Reception

To support multiple beam reception after receiving the multi-beam indication, the UE would use the information obtained from the indication to perform the subsequent reception and measurement on channel and interference.

Upon receiving the indication, the UE knows the channel observed in the DMRS port where the angle of arrival corresponding to CSI-RS resource 1 is the angle of arrival of the desired signal and the angle of arrival corresponding to CSI-RS resource 2 is the angle of arrival of the interference.

If the targeted resource is DMRS, the UE steers the receive analog beam weight to the angle of arrival of the desired signal to receive the channel part of the signal and perform channel estimation for demodulation. At the same time, the receive beam weight is designed to null the interference at the angle of arrival of the interference. Then the UE performs demodulation based on these channel and interference assumptions.

If the targeted resource is the CSI-RS for CSI acquisition, the UE may steers the receive beam weight to the angle of arrival of the desired signal to receive the channel part of the signal and perform channel estimation for CSI-acquisition. At the same time, the receive beam weight may be designed to null the interference at the angle of arrival of the interference. Then the UE may report CSI based on these channel and interference assumptions to the BS.

In some embodiments, the UE decides the receive beam according to power offset of channel interference components corresponding to CSI-RS resources.

Example Information

Some examples of the information that could be included in the report to ensure a sync-up between BS and UE for the beam indication and reception procedure includes:

- The number of components that the UE can use for signal enhancement.
- The number of components that the UE can use for interference nulling.
- The number of interfering beams that the UE can null (nulling capability).
- The structure of analog receive beamformer reported by the UE or indicated to the UE. For example, a Kronecker analog beamformer $f_{RF}=f_{(1)} \otimes f_{(2)} \otimes \ldots \otimes f_{(D)}$ where there are total D factors and M (<D) of D factors can be used for interference nulling and (D-M) is used for signal enhancements.
- The codebook used for signal enhancement and the codebook used for interference nulling.

Figure 4:
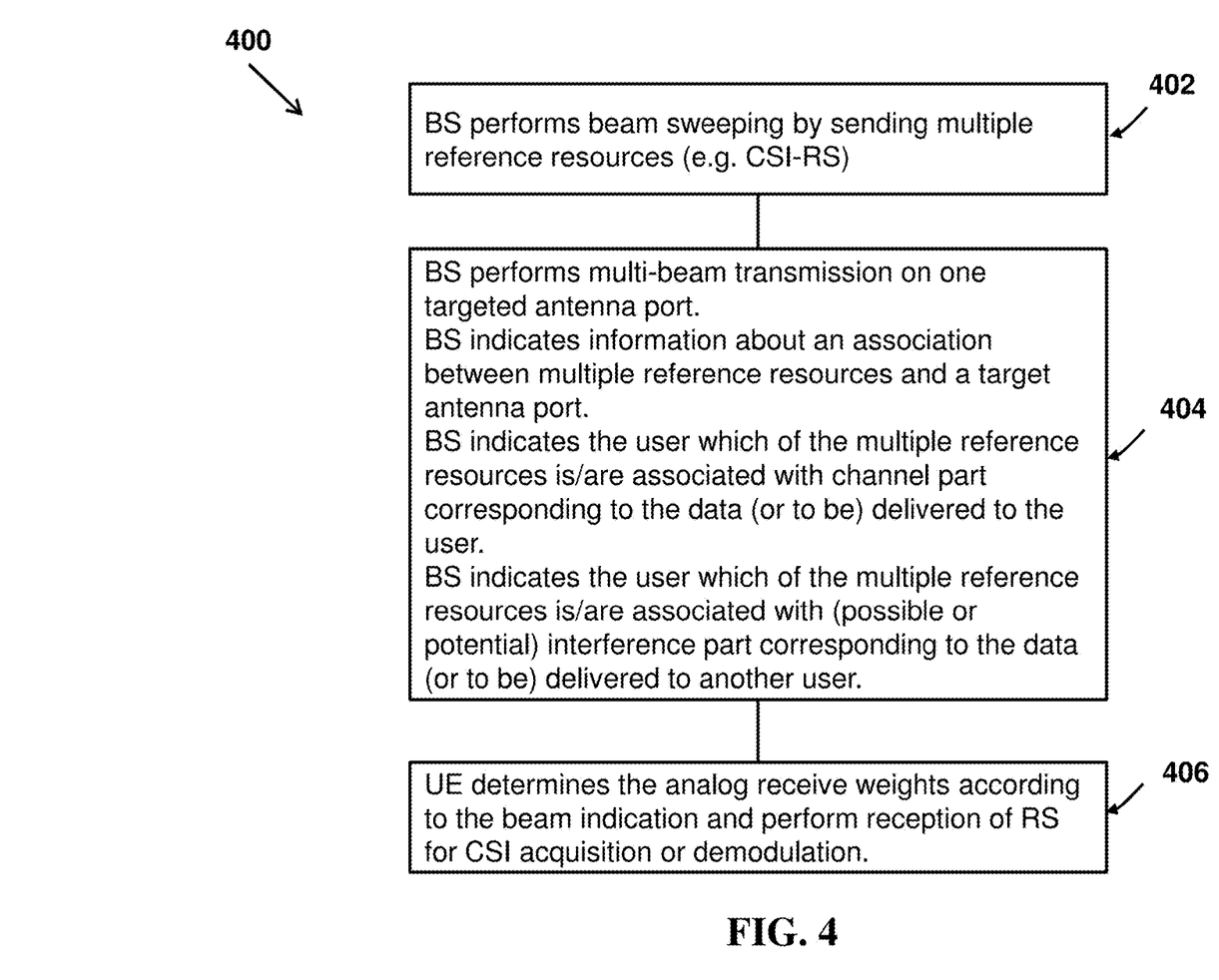
FIG. 4 is a flowchart for an example wireless communication method.

FIG. 4 shows an example procedure 400 of multi-beam indication and reception.

At 402, the BS may perform a beam sweeping operation by sending multiple reference resources such as the CSI-RS. The beam sweeping may be useful in an initial establishment of the beam patterns.

At 404, BS the may perform a multi-beam transmission on one targeted antenna port. BS indicates information about an association between multiple reference resources and a target antenna port.

The BS may indicate the user device which of the multiple reference resources is/are associated with channel part corresponding to the data (or to be) delivered to the user. The BS may indicate the user which of the multiple reference resources is/are associated with (possible or potential) interference part corresponding to the data (or to be) delivered to another user.

At 406, the UE determines analog receive weights according to the beam indication and perform reception of an RS for CSI acquisition or demodulation. The BS may send beam indication to the UE based on the capability. For example, capability may include the maximum number of reference resources associated with data and the maximum number of reference resources associated with the interference. The UE may determine the analog receive weights according to the beam indication and perform reception of RS for CSI acquisition or demodulation.

Figure 5:
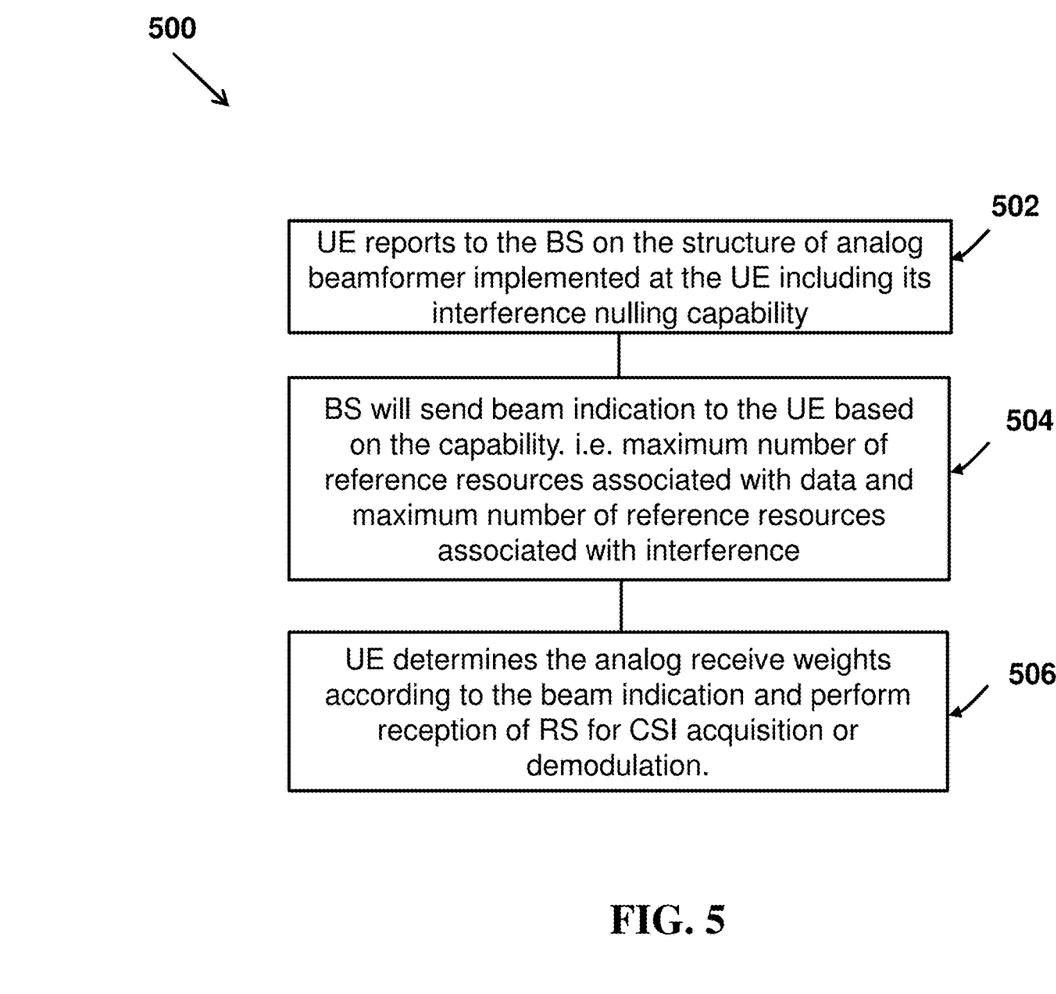
FIG. 5 is a flowchart for an example wireless communication method.

FIG. 5 shows an example procedure 500 for reporting interference cancellation capability.

At 502, UE reports to the BS on the structure of analog beamformer implemented at the UE including its interference nulling capability.

At 504, UE reports to the BS on the structure of analog beamformer implemented at the UE including its interference nulling capability.

At 506, UE determines the analog receive weights according to the beam indication and perform reception of RS for CSI acquisition or demodulation.

Figure 6:
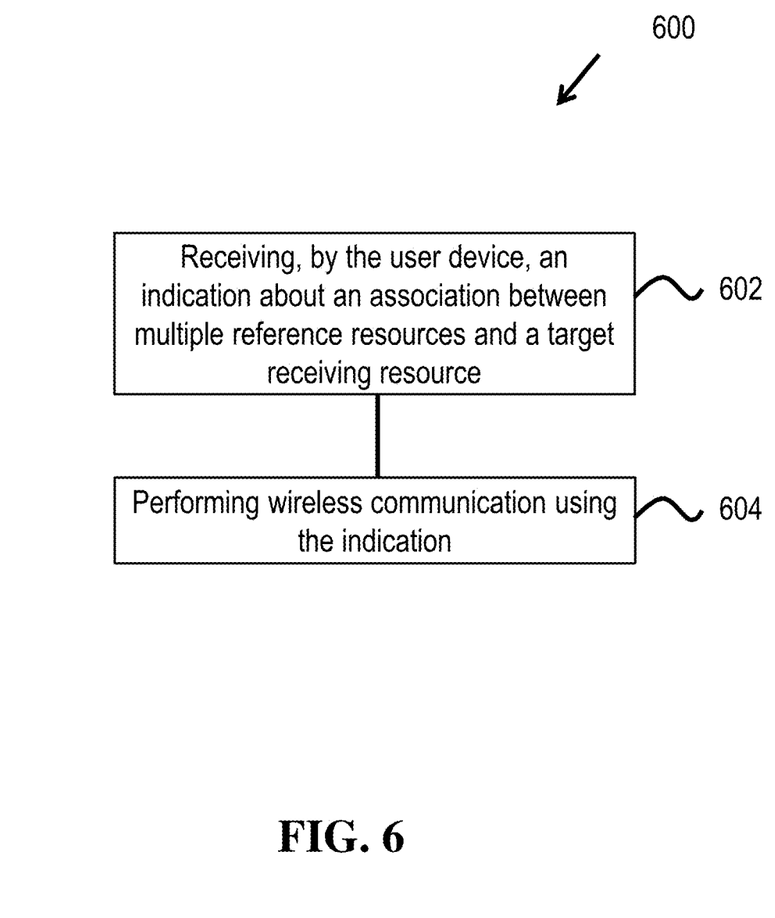
FIG. 6 is a flowchart for an example wireless communication method.

FIG. 6 shows a flowchart for a wireless communication method 600. The method 600 may be implemented at a base station. The method 600 includes, at 602, receiving, by the user device, an indication about an association between multiple reference resources and a target resource at the user device; wherein the association includes properties of a communication channel to and/or from the user device, and wherein at least one property of the communication channel is different among the multiple reference resources. The method 600 includes, at 604, performing further wireless communication using the information. As described herein, the information may be used to selectively filter out unwanted interference or filter to receive a desired signal.

In some embodiments, X (X an integer greater than 1) number of multiple resources may be indicated in the association. Each of the X reference resources may correspond to channel part or interference part of the target resource supporting at least one of the following data or reference transmissions: (1) All X reference resources correspond to the channel part of the same layer of the data or reference signal transmission, (2) Different reference resources may correspond to the channel part of different layer of the data or reference signal transmission, (3) X1 (where X1<=X) out of X reference resources correspond to channel part of the target resource. The remaining (X−X1) reference resources correspond to interference part of the target resource.

In some embodiments, each reference or target resource may be one of the following type of resource: (1) A reference signal resource comprising of one or multiple ports, (2) One antenna port or antenna port group of a reference signal resource with the same scrambling sequence, (3) One antenna port or antenna port group of a reference signal resource with multiple scrambling sequences.

The method 600 may further include reporting, from the user device, a report that includes at least one of the following information of the user device related to the information in the indication. (1) the maximum number of reference resources the user device supports, (2) Which channel properties that are assumed to be the same among the reference resources, (3) Which channel properties that can be different among the reference resources, (4) What types of reference resources can be indicated.

In some embodiments, the method 600 may further include performing measurements on a first received signal based on the received information about the association by distinguishing a channel part of the first received signal from an interference part of the first received signal based on the information, and recovering, using results of the measurements, data from a second received signal. The channel part may correspond to user data intended for reception by the user device and the interference part may correspond to data being transmitted to another user device. In various embodiments, the channel part and the interference part in the target resource may be distinguished by at least one of the following ways: (1) Different scrambling sequences in the target resource, (2) Different antenna ports in the target resource, and (3) Different groups of antenna ports in the target resource.

The method 600 may further include performing measurements on a first received signal based on the received information about the association by distinguishing a channel part of the first received signal from an interference part of the first received signal based on the information, and reporting, using results of the measurements, channel state information. The user device may perform data or reference signal transmission on target resource based on the association.

In some embodiments, the association may imply that the channel over which a symbol on the target antenna port is conveyed can be inferred from the multiple channels observed over which other symbols on the reference antenna ports are conveyed. In some embodiments, the multiple reference resources associated with the same target receiving resource have the same channel properties with respect to a subset of channel properties. For example, the subset of channel properties may include Doppler spread and Doppler shift.

In some embodiments, the indication includes the power information associated with each of the multiple reference resources. For example, in some embodiments, the power information included the power offset(s) among the channel part(s) or interference part(s) of the target resource associated with the multiple reference resources.

Figure 7:
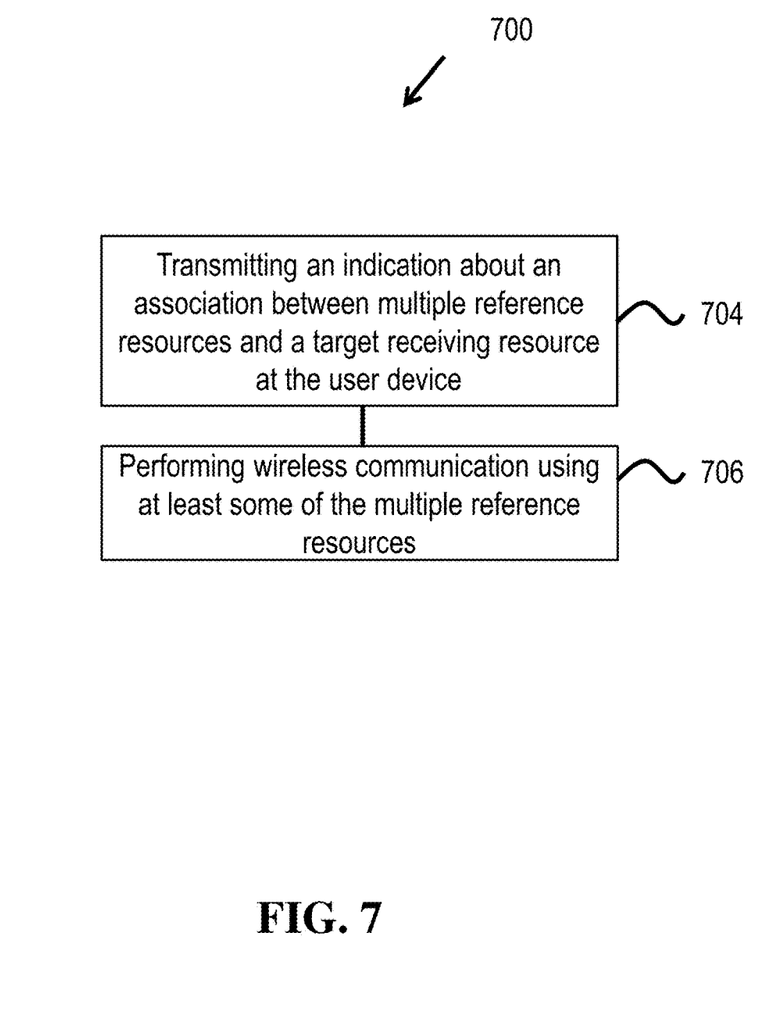
FIG. 7 is a flowchart for an example wireless communication method.

FIG. 7 shows a flowchart for a wireless communication method 700. The method 700 may be implemented at a base station. The method 700 includes transmitting (704), to the user device, an indication about an association between multiple reference resources and a target resource at the user device, wherein the association includes properties of a communication channel to and/or from the user device, and wherein at least one property of the communication channel is different among the multiple reference resources. The method 700 may also include performing (706) wireless communication using at least some of the multiple reference resources to transmit a signal to the user device. This operation 706 may be a reception of a wireless message or a transmission of a wireless signal.

In some embodiments, a wireless communication apparatus comprising a memory and a processor may be implemented such that the memory stores instructions and the processor is configured to read the instructions from the memory and implement a method or procedure described herein, e.g., the method 600 or the method 700.

It would be appreciated that the present document discloses techniques in which Information related to multiple reference resources is indicated by BS to UE for the association with one targeted resource (i.e., one targeted antenna port) in terms of channel properties (at least including one of the following channel properties: Doppler spread, Doppler shift, delay spread, average delay, average gain, angle of arrival, angle of departure, angular spread, spatial correlation).

In some embodiments, the information includes the information to distinguish which reference resources are belonged to channel part and which reference resources are belonged to interference part.

In some embodiments, a UE performs the channel and interference measurement based on the receive weights determined according to the indication. The UE may perform data demodulation based on the indicated channel and interference assumption. The UE may perform CSI feedback based on the indicated channel and interference assumption.

It will also be appreciated that using the disclosed technique, UE reports number of components that the UE can use for signal enhancement and number of components that the UE can use for interference nulling. The structure of analog receive beamformer reported by the UE or indicated to the UE. In some embodiments, a Kronecker analog beamformer $fRF=f(1) \otimes f(2) \otimes \ldots \otimes f(D)$ where there are total D factors and $M(<D)$ of D factors can be used for interference nulling and (D-M) is used for signal enhancements.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   receiving, by a user device, an indication about an association between X reference resources, where X is an integer greater than 1, and a target resource, wherein the association includes properties of a communication channel to and/or from the user device, and wherein at least one property of the communication channel is different among the X reference resources; and
   wherein each of the X reference resources corresponds to a channel part or an interference part of the target resource, and
   wherein the indication includes power information related to the channel part or the interference part of the target resource associated with each of the X reference resources, and wherein the power information includes a power offset among channel parts or interference parts of the target resource associated with the X reference resources.

2. The method of claim 1, wherein each of the X reference resources corresponds to the channel part or the interference part of the target resource supporting at least one of following characteristics that include (1) all of the X reference resources correspond to the channel part of a same layer of a transmission of data or a reference signal, (2) different reference resources correspond to the channel part of different layers of the transmission of the data or the reference signal, or (3) X1 out of the X reference resources, where X1 is an integer less than or equal to X, correspond to the channel part of the target resource and remaining (X−X1) reference resources correspond to the interference part of the target resource.

3. The method of claim 2, further including:
   distinguishing between the channel part and the interference part in the target resource at least based on: (1) different scrambling sequences in the target resource, or (2) different antenna ports in the target resource, or (3) different groups of antenna ports in the target resource.

4. The method of claim 1, wherein each of a reference resource and the target resource is one of following type of resources: (1) a reference signal resource comprising of one or multiple ports, (2) one antenna port or an antenna port group of a reference signal resource with a same scrambling sequence, or (3) one antenna port or antenna port group of a reference signal resource with multiple scrambling sequences.

5. The method of claim 1, further including:
   performing measurements on a first received signal based on the indication about the association by distinguishing a channel part of the first received signal from an interference part of the first received signal based on the indication; and
   recovering, using results of the measurements, data from a second received signal, wherein the channel part corresponds to data for the user device and the interference part corresponds to a signal for another user.

6. The method of claim 1, further including:
   performing measurements on a first received signal based on the indication about the association by distinguishing a channel part of the first received signal from an interference part of the first received signal based on the indication; and
   reporting, using results of the measurements, channel state information (CSI).

7. The method of claim 1, further including:
   performing a transmission of data or a reference signal by the user device on the target resource based on the indication about the association or
   providing a feedback message for updating the indication about the association between multiple reference resources and the target resource at the user device, the feedback message identifies a first codebook used for signal enhancement and a second codebook used for interference nulling.

8. The method of claim 1, wherein the indication includes information about one or more of following association types: (1) the association between multiple reference resources and the target resource includes information about at least one of following channel properties: Doppler spread, Doppler shift, delay spread, average delay, average gain, angle of arrival, angle of departure, angular spread, spatial correlation, reciprocal channel properties, or beam correspondence, (2) the association between multiple reference resources and the target resource so that the target resource represents a composite channel that is a composite of channels observed from multiple reference resources, or (3) the association between multiple reference resources and the target resource so that the target resource represents a composite channel that is a composite of channels observed from multiple reference resources, and wherein the association means the communication channel over which a symbol on a target antenna port is conveyed can be inferred from multiple channels observed over which other symbols on reference antenna ports are conveyed, wherein the multiple reference resources associated with a same target receiving resource have same channel properties with respect to a subset of channel properties, or wherein the subset of channel properties includes a Doppler spread and a Doppler shift.

9. The method of claim 1, further including:

reporting, from the user device, a report that includes at least one of following information of the user device related to information in the indication: (1) a maximum number of reference resources the user device can support, (2) channel properties that are same among the X reference resources, (3) channel properties that are different among the X reference resources, (4) types of reference resources that can be indicated, and wherein the report includes at least one of first information about a first number of signal processing resources supported by the user device for signal enhancement or second information about a second number of signal processing resources supported by the user device for interference nulling.

10. A method of wireless communications, comprising:

transmitting, to a user device, an indication about an association between X reference resources, where X is an integer greater than 1, and a target resource, wherein the association includes properties of a communication channel to and/or from the user device, and wherein at least one property of the communication channel is different among the X reference resources; and wherein each of the X reference resources corresponds to a channel part or an interference part of the target resource, and wherein the indication includes power information related to the channel part or the interference part of the target resource associated with each of the X reference resources, and wherein the power information includes a power offset among channel parts or interference parts of the target resource associated with the X reference resources.

11. The method of claim 10, wherein each of the X reference resources corresponds to the channel part or the interference part of the target resource supporting at least one of following characteristics that include (1) all of the X reference resources correspond to the channel part of a same layer of a transmission of data or a reference signal, (2) different reference resources correspond to the channel part of different layers of the transmission of the data or the reference signal, or (3) X1 out of the X reference resources, where X1 is an integer less than or equal to X, correspond to the channel part of the target resource and remaining (X-X1) reference resources correspond to the interference part of the target resource.

12. The method of claim 10, wherein each of a reference resource and the target resource is one of following type of resources: (1) a reference signal resource comprising of one or multiple ports, (2) one antenna port or an antenna port group of a reference signal resource with a same scrambling sequence, or (3) one antenna port or antenna port group of a reference signal resource with multiple scrambling sequences, and wherein the method further includes:

distinguishing between a channel part and an interference part in the target resource are by at least based on: (1) different scrambling sequences in the target resource, or (2) different antenna ports in the target resource, or (3) different groups of antenna ports in the target resource.

13. The method of claim 10, further including:

performing a transmission of data or a reference signal by the user device on the target resource based on the indication about the association, or performing a transmission that uses at least some of the X reference resources to transmit a signal to another user device.

14. The method of claim 10, wherein the indication includes information about one or more of following association types: (1) the association between multiple reference resources and the target resource includes information about at least one of following channel properties: Doppler spread, Doppler shift, delay spread, average delay, average gain, angle of arrival, angle of departure, angular spread, spatial correlation, reciprocal channel properties, or beam correspondence, (2) the association between multiple reference resources and the target resource so that the target resource represents a composite channel that is a composite of channels observed from multiple reference resources, or (3) the association between multiple reference resources and the target resource so that the target resource represents a composite channel that is a composite of channels observed from multiple reference resources.

15. The method of claim 10, further including:

receiving a report of the user device, wherein the indication is partly based on the report, wherein the report includes at least one of first information about a first number of signal processing resources available for signal enhancement or second information about a second number of signal processing resources available for interference nulling.

16. A wireless communication apparatus comprising a memory and a processor, wherein the memory is configured to store processor executable code and the processor is configured to read the processor executable code from the memory and implement a method including:

receiving, by a user device, an indication about an association between X reference resources, where X is an integer greater than 1, and a target resource, wherein the association includes properties of a communication channel to and/or from the user device, and wherein at least one property of the communication channel is different among the X reference resources; and wherein each of the X reference resources corresponds to a channel part or an interference part of the target resource, and wherein the indication includes power information related to the channel part or the interference part of the target resource associated with each of the X reference resources, and wherein the power information includes a power offset among channel parts or interference parts of the target resource associated with the X reference resources.

17. The wireless communication apparatus of claim 16, wherein each of the X reference resources corresponds to the channel part or the interference part of the target resource supporting at least one of following characteristics that include (1) all of the X reference resources correspond to the channel part of a same layer of a transmission of data or a reference signal, (2) different reference resources correspond to the channel part of different layers of the transmission of the data or the reference signal, or (3) X1 out of the X reference resources, where X1 is an integer less than or equal to X, correspond to the channel part of the target resource and remaining (X-X1) reference resources correspond to the interference part of the target resource.

18. A wireless communication apparatus comprising a memory and a processor, wherein the memory is configured to store processor executable code and the processor is configured to read the processor executable code from the memory and implement a method including:

transmitting, to a user device, an indication about an association between X reference resources, where X is an integer greater than 1, and a target resource, wherein the association includes properties of a communication channel to and/or from the user device, and wherein at least one property of the communication channel is different among the X reference resources; and wherein each of the X reference resources corresponds to a channel part or an interference part of the target resource, and wherein the indication includes power information related to the channel part or the interference part of the target resource associated with each of the X reference resources, and wherein the power information includes a power offset among channel parts or interference parts of the target resource associated with the X reference resources.

19. The wireless communication apparatus of claim 18, wherein the method further includes:

receiving a report of the user device, wherein the indication is partly based on the report, wherein the report includes at least one of first information about a first number of signal processing resources available for signal enhancement or second information about a second number of signal processing resources available for interference nulling.

* * * * *

UNITED STATES PATENT AND TRADEMARK OFFICE
CERTIFICATE OF CORRECTION

PATENT NO. : 12,218,782 B2  
APPLICATION NO. : 18/528564  
DATED : February 4, 2025  
INVENTOR(S) : Yu Ngok Li et al.

Page 1 of 1

It is certified that error appears in the above-identified patent and that said Letters Patent is hereby corrected as shown below:

In the Claims  
In Column 10, Line 56, in Claim 7, delete "association" and insert --association,--  
In Column 13, Line 9, in Claim 17, delete "X1out" and insert --X1 out--

Signed and Sealed this  
Eighth Day of April, 2025

Coke Morgan Stewart  
*Acting Director of the United States Patent and Trademark Office*